US010301027B2

(12) United States Patent
Gill et al.

(10) Patent No.: US 10,301,027 B2
(45) Date of Patent: May 28, 2019

(54) ARRANGEMENT OF SEAT UNITS IN A VEHICLE CABIN

(71) Applicant: Safran Seats GB Limited, Gwent (GB)

(72) Inventors: Alison Gill, Toulouse (FR); Rachel Lisa West, Gwent (GB); Claude Martin, Lury sur Arnon (FR); Paul Willis, Bristol (GB)

(73) Assignee: Safran Seats GB Limited, Cwmbran (GB)

(*) Notice: Subject to any disclaimer, the term of this patent is extended or adjusted under 35 U.S.C. 154(b) by 201 days.

(21) Appl. No.: 15/031,554

(22) PCT Filed: Oct. 24, 2014

(86) PCT No.: PCT/IB2014/065598
§ 371 (c)(1),
(2) Date: Apr. 22, 2016

(87) PCT Pub. No.: WO2015/059676
PCT Pub. Date: Apr. 30, 2015

(65) Prior Publication Data
US 2016/0257408 A1    Sep. 8, 2016

Related U.S. Application Data

(60) Provisional application No. 61/895,076, filed on Oct. 24, 2013.

(51) Int. Cl.
*B64D 11/06* (2006.01)
(52) U.S. Cl.
CPC ...... *B64D 11/0604* (2014.12); *B64D 11/0601* (2014.12); *B64D 11/0606* (2014.12); *B64D 11/0641* (2014.12)

(58) Field of Classification Search
CPC .......... B64D 11/0604; B64D 11/0606; B64D 11/0601; B64D 11/0641
See application file for complete search history.

(56) References Cited

U.S. PATENT DOCUMENTS 8,313,059 B2 * 11/2012 Ferry ................. B60N 2/206
244/118.6
9,796,473 B2 * 10/2017 Saint-Jalmes .......... A61G 3/001
(Continued)

FOREIGN PATENT DOCUMENTS

WO    2003013942    2/2003
WO    2009009005    1/2009

OTHER PUBLICATIONS

Europe Patent Application No. 14808714.1, Communication Pursuant to Article 94(3) EPC (examination report) dated Nov. 27, 2017.
(Continued)

Primary Examiner — Valentina Xavier
(74) Attorney, Agent, or Firm — Kilpatrick Townsend & Stockton LLP; Tiffany L. Williams; Dean W. Russell

(57) ABSTRACT

Described are commercial aircraft cabin arrangement comprising a plurality of seat units (14), each seat unit including a primary seat (16) and a secondary seat (18) arranged facing one another. The primary seat (16) and the secondary seat (18) are configured to combine into a single bed position for the seat unit. The plurality of seat units (14) are arranged in two columns separated by a wide central aisle (72).

18 Claims, 11 Drawing Sheets

(56) References Cited

U.S. PATENT DOCUMENTS

| | | | |
|---|---|---|---|
| 2002/0191744 A1* | 12/2002 | Mirabella | A61B 6/4405 |
| | | | 378/102 |
| 2005/0001097 A1* | 1/2005 | Saint-Jalmes | B64D 11/00 |
| | | | 244/118.6 |
| 2005/0023413 A1* | 2/2005 | Saint-Jalmes | B64D 11/00 |
| | | | 244/118.6 |
| 2006/0145457 A1 | 7/2006 | Prenzel et al. | |
| 2006/0192050 A1* | 8/2006 | Cheung | B64D 11/00 |
| | | | 244/118.6 |
| 2007/0262625 A1 | 11/2007 | Dryburgh et al. | |
| 2011/0180618 A1* | 7/2011 | Schumacher | B64D 13/00 |
| | | | 236/44 A |
| 2014/0342648 A1* | 11/2014 | Hart | B64D 13/06 |
| | | | 454/76 |
| 2015/0157884 A1* | 6/2015 | Armatorio | B64D 13/06 |
| | | | 128/202.26 |

OTHER PUBLICATIONS

International Patent Application No. PCT/IB2014/065598, International Preliminary Report on Patentability dated May 6, 2016, 9 pages.
International Patent Application No. PCT/IB2014/065598, Search Report and Written Opinion dated Jan. 23, 2015.

\* cited by examiner

ARRANGEMENT OF SEAT UNITS IN A VEHICLE CABIN

CROSS REFERENCE TO RELATED APPLICATIONS

This application is the U.S. national phase entry of International Patent Application Serial No. PCT/IB2014/065598 ("the '598 application"), filed on Oct. 24, 2014, which application is related to and claims priority benefits from U.S. Provisional Application Ser. No. 61/895,076 ("the '076 application"), filed on Oct. 24, 2013, entitled A380 RETROFIT. The '598 and '076 applications are hereby incorporated in their entireties by this reference.

FIELD OF THE INVENTION

The invention relates to an arrangement of seat units for vehicle cabins.

BACKGROUND

As is well-known, business and first class aircraft seats offer passengers different comfort positions, from the seat position to a bed position that is substantially horizontal in flight.

Most first class seating arrangements provide seat units that offer some level of privacy to a passenger seated therein, but the first class cabin nevertheless retains the feel of an aircraft, albeit with more room and conveniences than lower class cabins. These first class cabins lack a feel of a luxury and well-being that are typically associated with spas and high-end lounges. In particular, the seats themselves still retain a conventional style in a seat position that reminds each passenger that they are still in an aircraft cabin.

Thus, it may be desirable to create an entirely new first class cabin concept using a modern minimalist approach that streamlines a shape and feel of each seat unit and expands the open spaces between columns of seat units to create an open concept that is more reminiscent of home or a lounge than an aircraft cabin. It may also be desirable to provide seats within each seat unit that are arranged and shaped to have more of a feel of a living room than an aircraft seating arrangement. It may also be desirable to include personal areas within each seat unit for wellbeing and/or a larger wellbeing zone to counteract the negative health effects of airline travel.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a wide-body commercial aircraft cabin arrangement comprises a plurality of seat units, each seat unit comprising a primary seat and a secondary seat arranged facing one another, wherein the primary seat and the secondary seat are configured to combine into a single bed position for the seat unit, and wherein the plurality of seat units are arranged in two columns separated by a wide central aisle.

In some embodiments, each seat unit further comprises a wellbeing area comprising a lavatory. Each seat unit may further comprise at least one privacy curtain that substantially encloses each seat unit. Each seat unit may further comprise a side extension arranged along one side of a space between the primary seat and the secondary seat.

In certain embodiments, the single bed position may comprise a surface area that is greater than 4000 square inches.

According to some embodiments, the primary seat comprises a width that is configured for two passengers to share the primary seat. The primary seat may also comprise a width that is configured for a passenger to be seated in multiple orientations within the primary seat, which range from having his or her body oriented in a direction that is substantially parallel to a longitudinal axis of the seat unit to having his or her body oriented in a direction that is substantially perpendicular to the longitudinal axis of the seat unit.

In some embodiments, the columns are staggered from one another so that the seat units within one of the two columns are not laterally aligned with the seat units within the other one of the two columns.

According to certain embodiments of the present invention, an aircraft cabin arrangement comprises a plurality of seat units, each seat unit comprising a primary seat and a secondary seat arranged facing one another, and a side extension arranged along one side of a space between the primary seat and the secondary seat, wherein the primary seat, the secondary seat, and the side extension are configured to combine into a single bed position for the seat unit having a surface area that is greater than 4000 square inches, and wherein the plurality of seat units are arranged in two columns separated by a wide central aisle.

In some embodiments, each seat unit further comprises a wellbeing area comprising a lavatory. Each seat unit may further comprise at least one privacy curtain that substantially encloses each seat unit.

According to some embodiments, the primary seat comprises a width that is configured for two passengers to share the primary seat. The primary seat may also comprise a width that is configured for a passenger to be seated in multiple orientations within the primary seat, which range from having his or her body oriented in a direction that is substantially parallel to a longitudinal axis of the seat unit to having his or her body oriented in a direction that is substantially perpendicular to the longitudinal axis of the seat unit.

In some embodiments, the columns are staggered from one another so that the seat units within one of the two columns are not laterally aligned with the seat units within the other one of the two columns.

According to certain embodiments of the present invention, an aircraft cabin arrangement comprises a plurality of seat units, each seat unit comprising a primary seat and a secondary seat arranged facing one another, wherein the primary seat and the secondary seat are configured to combine into a single bed position for the seat unit, wherein the plurality of seat units are arranged in two columns separated by a wide central aisle; and a wellbeing zone comprising an air supply comprising an enriched oxygen and moisture content, as compared to an oxygen and moisture content of the air supply to surrounding areas of the aircraft cabin.

In some embodiments, each seat unit further comprises a wellbeing area comprising a lavatory. Each seat unit may further comprise at least one privacy curtain that substantially encloses each seat unit.

In certain embodiments, the single bed position may comprise a surface area that is greater than 4000 square inches.

According to some embodiments, the primary seat comprises a width that is configured for two passengers to share the primary seat.

In some embodiments, the columns are staggered from one another so that the seat units within one of the two columns are not laterally aligned with the seat units within the other one of the two columns.

BRIEF DESCRIPTION OF THE DRAWINGS

In the following detailed description, embodiments of the invention are described referring to the following figures.

DETAILED DESCRIPTION

Figure 1:
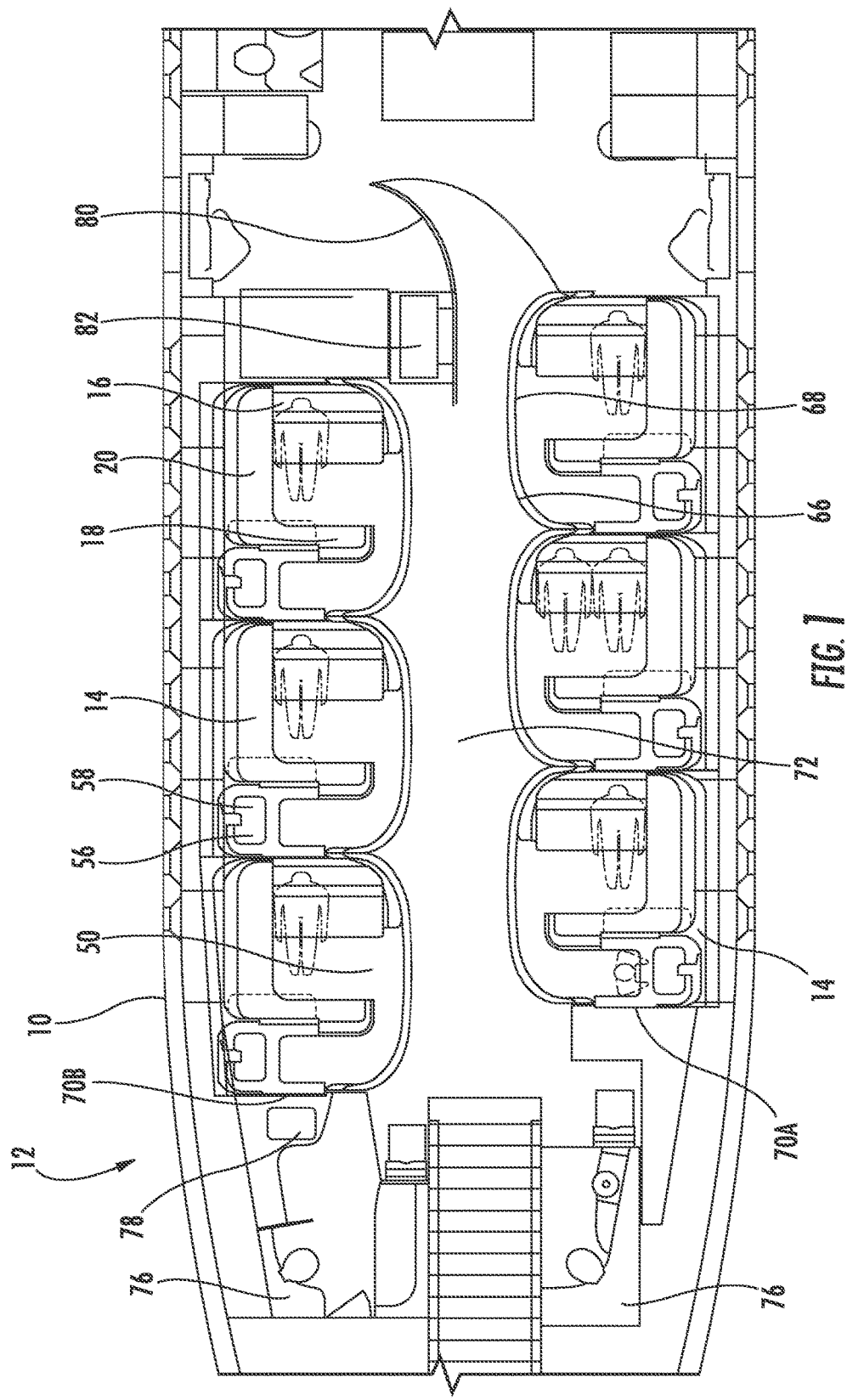
FIG. 1 is a top view of a cabin comprising an arrangement of a plurality of seat units, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of seat units may be described with reference to an aircraft cabin, they are by no means so limited. In fact, the seat units may be used in conjunction with any type of vehicle cabin or otherwise as desired.

According to certain embodiments of the present invention, as illustrated in FIGS. 1-11, a cabin 10 comprises an arrangement 12 formed by a plurality of seat units 14, each seat unit 14 comprising a primary seat 16 and a secondary seat 18, wherein the primary seat 16 and secondary seat 18 are arranged to face one another, and a side extension 20 arranged along one side of a space between the two seats 16, 18.

In certain embodiments, the primary seat 16 has a width that is wider than a conventional business class passenger seat. For example, in certain embodiments, the primary seat 16 may be up to or greater than 50 inches wide. Furthermore, the primary seat 16 may be equipped with safety features to serve as a single or double taxi, take off, and landing ("TTL") seat.

In these embodiments, as best illustrated in FIGS. 1-2, 8-9 and 11, the primary seat 16 may be sufficiently wide to allow two passengers to comfortably share the primary seat 16, similar to that of a living room loveseat or small sofa. The primary seat 16 may also be sufficiently wide for a passenger to be seated with his or her body oriented in a direction that is substantially parallel to a longitudinal axis Y of the seat unit 14, or the passenger may be seated with his or her body oriented in a direction that is angled (or even substantially perpendicular) to the longitudinal axis Y of the seat unit 14.

The side extension 20 is arranged to extend along a side of the primary seat 16 proximate a wall of the cabin 10, along a space between the primary seat 16 and the secondary seat 18, and to extend along a side of the secondary seat 18 proximate the wall of the cabin 10. The arrangement of the primary seat 16, the side extension 20, and the secondary seat 18 may form a "U" configuration in certain embodiments.

The primary seat 16 comprises a seat back 22 and a seat pan 24, which may be partially surrounded by a shell 26. The shell 26 may be configured to also at least partially surround the side extension 20 and the secondary seat 18, as best shown in FIGS. 5-7.

Figure 4:
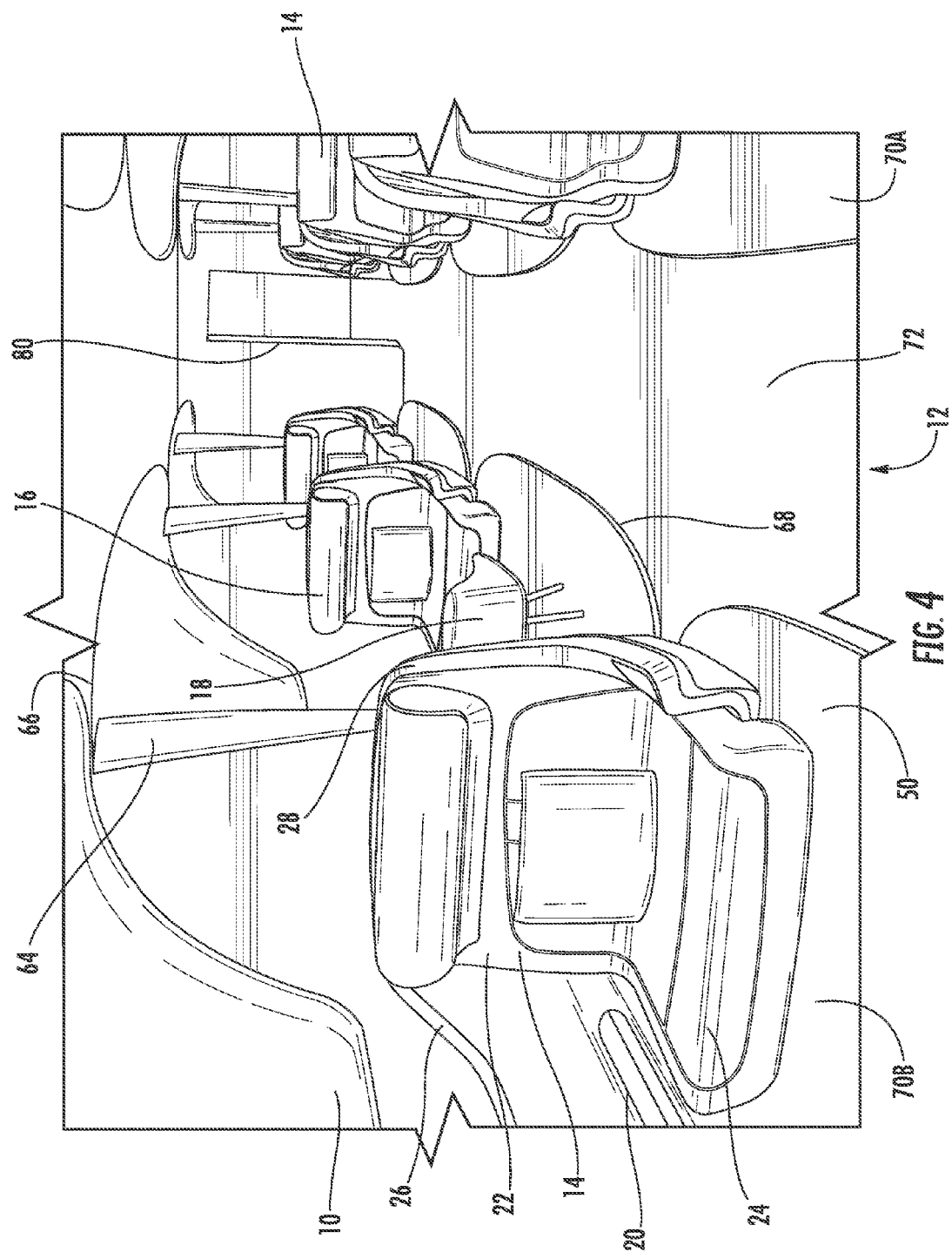
FIG. 4 is a perspective view of a cabin comprising an arrangement of a plurality of seat units, according to certain embodiments of the present invention.
Figure 5:
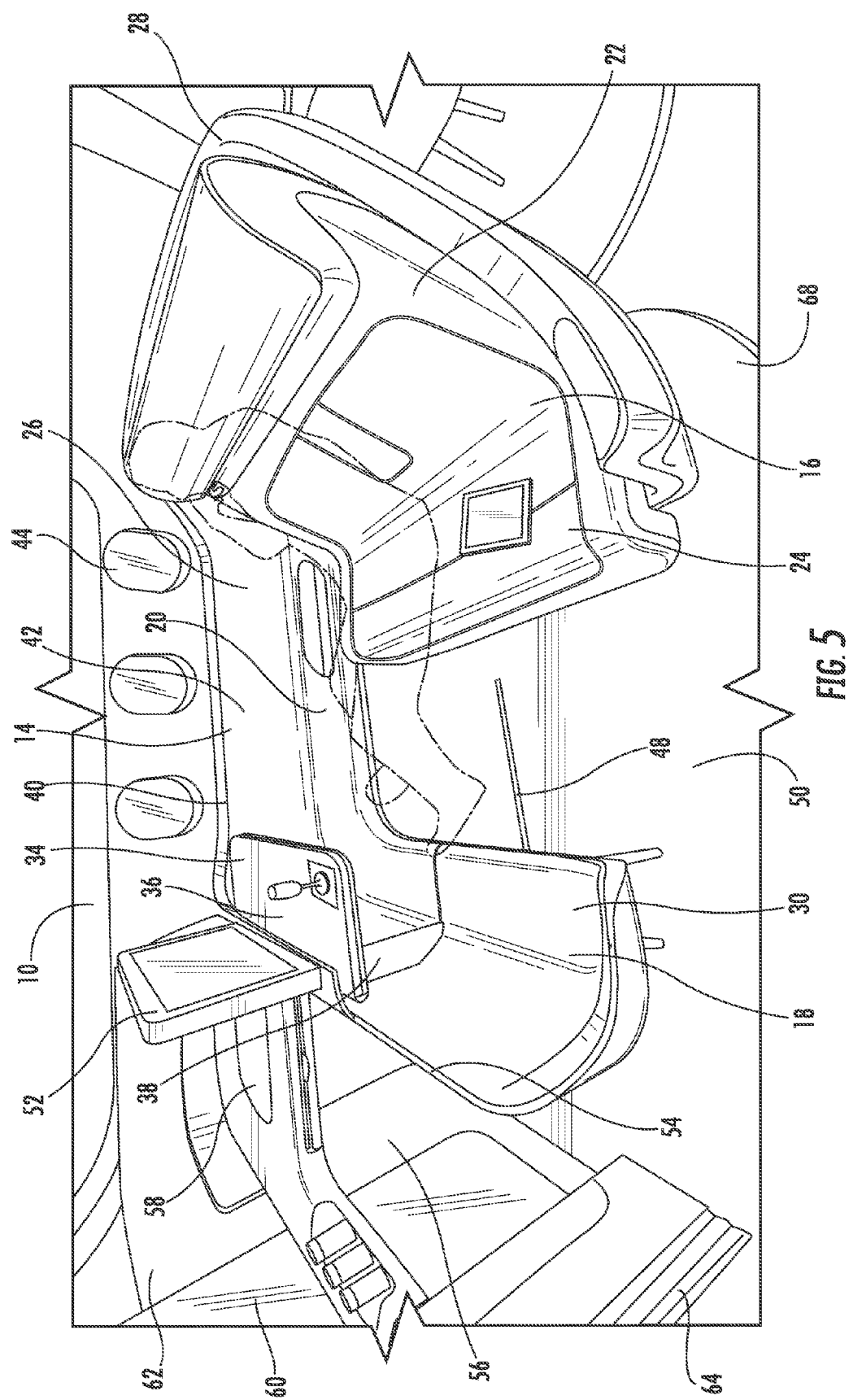
FIG. 5 is a perspective view of a seat unit with both seats in a seat position and a tray table in a stowed position, according to certain embodiments of the present invention.
Figure 6:
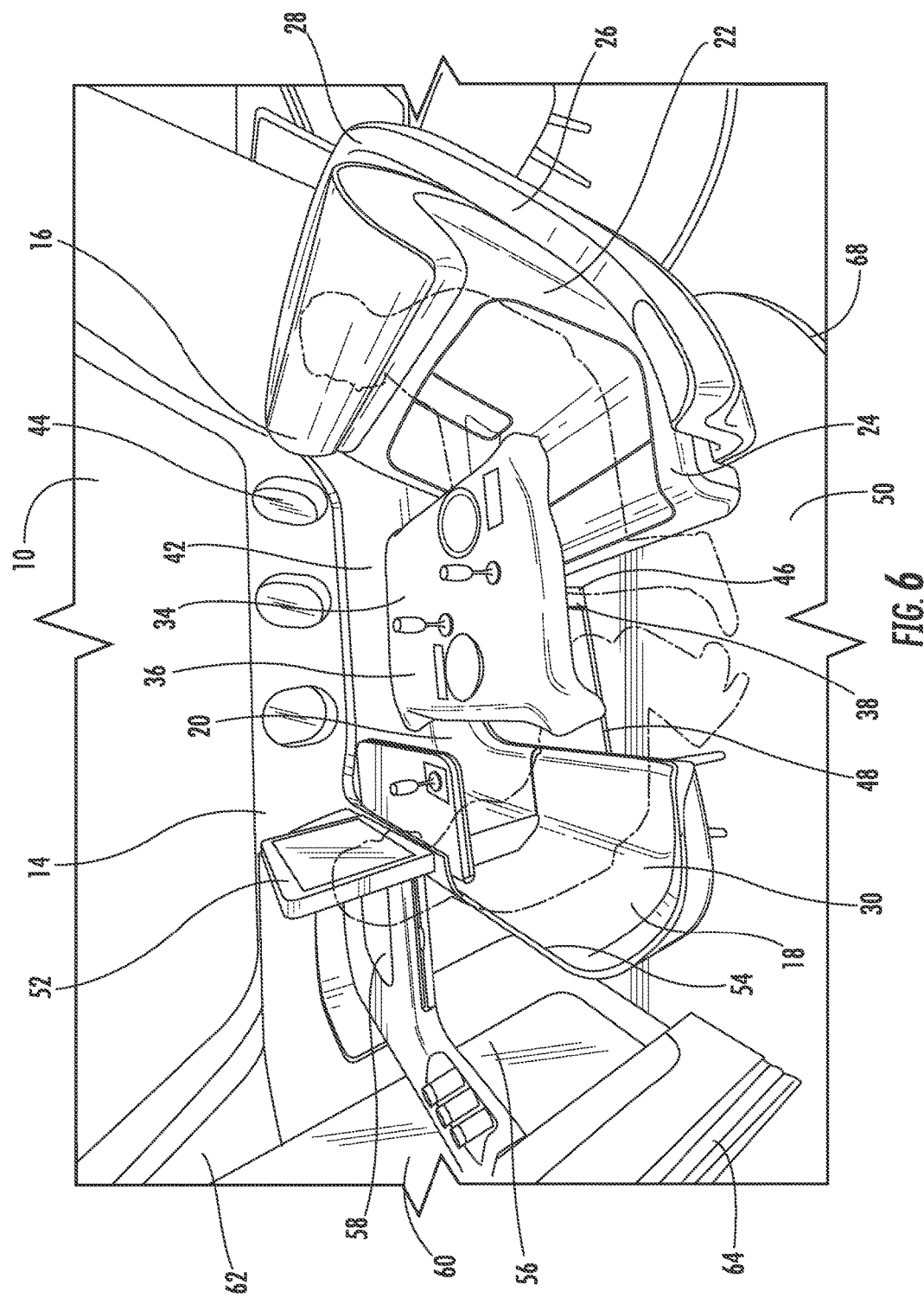
FIG. 6 is a perspective view of a seat unit with both seats in a seat position and a tray table in a deployed dining position, according to certain embodiments of the present invention.
Figure 7:
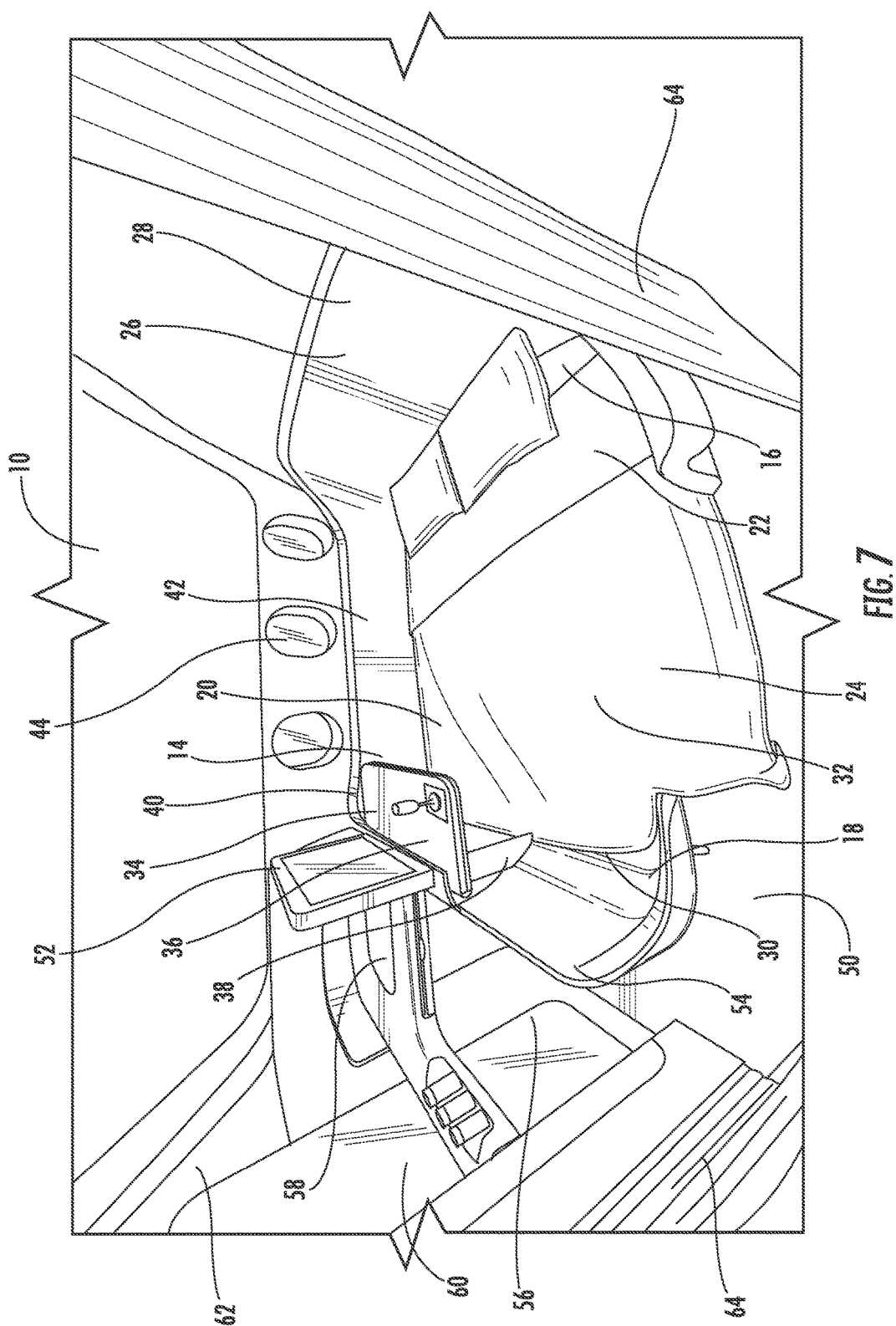
FIG. 7 is a perspective view of a seat unit with both seats in a bed position, according to certain embodiments of the present invention.

Furthermore, the primary seat 16 is configured to convert between a seat position (as best illustrated in FIGS. 4-6) and a bed position that is substantially horizontal in flight (as best illustrated in FIG. 7). In the seat position, the seat back 22 is positioned so that the seat back 22 is substantially vertical and positioned adjacent a rear wall 28 of the shell 26. To transition the primary seat 16 into the bed position, the seat pan 24 is moved toward the secondary seat 18, and the seat back 22 slides down and toward the secondary seat 18 until the seat back 22 is also substantially horizontal. The secondary seat 18 comprises a seat pan 30 that is positioned at a height that substantially aligns and mates with the seat pan 24 in the bed position, and the side extension 20 is also positioned at a height that substantially aligns and mates with the seat pan 24 and the seat back 22 in the bed position so that the combination of the seat pan 30 of the secondary seat 18, the side extension 20, the seat pan 24, and the seat back 22 form a bed surface 32. In certain embodiments, the bed surface 32 comprises a surface area that is equal to or greater than a conventional double (54 inches×75 inches, or 4050 square inches) or queen (60 inches×80 inches, or 4800 square inches) mattress.

In certain embodiments, a table 34 comprises a table surface 36 coupled to a support leg 38. An end of the table surface 36 is slidingly coupled to a track 40 mounted in a side wall 42 of the shell 26, which may be positioned below one or more windows 44 of the cabin 10. A lower end 46 of the support leg 38 is slidingly coupled to a track 48 positioned in a platform 50 that supports the seat unit 14. The tracks 40 and 48 may be shaped to allow the table to move between a stowed position, which is adjacent the secondary seat 18 and positioned over a portion of the side extension 20 (as shown in FIG. 5), to a deployed dining position, which is positioned in the space between the primary seat 16 and the secondary seat 18 to allow face to face or side by side dining options within the seat unit 14 (as shown in FIG. 6).

As illustrated in FIGS. 5-7, a monitor 52 may be mounted to a portion 54 of the shell 26 that at least partially surrounds the side extension 20 so that the monitor 52 is configured to face the primary seat 16.

As illustrated in FIGS. 1-3 and 5-8, the seat unit 14 may further comprise a wellbeing area 56 positioned behind the secondary seat 18 and the monitor 52. The wellbeing area 56 may comprise a lavatory 58 and mirror 60 to allow a passenger to freshen up without having to leave the seat unit 14. The shell 26 may further comprise walls 62 that at least partially surround the wellbeing area 56 to provide additional privacy and a mounting location for the mirror 60.

As illustrated in FIGS. 4 and 7, the entire seat unit 14 may be enclosed for privacy via at least one privacy curtain or screen 64, which may be mounted to a track 66 that is shaped to correspond to an outer edge 68 of the platform 50, and which is positioned to mate with edges of the shell 26 to substantially enclose the seat unit 14. Actuation of the closure mechanism for the privacy curtain or screen 64 may be automated in certain embodiments for operation via a remote control or other switch within the seat unit 14.

In certain embodiments, as illustrated in FIGS. 1-2, 4, 8-9, and 11, the arrangement 12 comprises two columns 70A, 70B of seat units 14, each positioned along a wall of the cabin 10 and separated by a wide central aisle 72. The wider central aisle 72 creates an open cabin feel, which further adds to the spacious design of the seat units 14. An arrangement with a single central aisle 72 and only two columns 70A, 70B is a lavish amount of space on a wide-body commercial aircraft cabin 10, and further adds to the open feeling of the cabin 10, which is in contrast to conventional first class arrangements on similar wide-body commercial aircraft cabins, which typically include two aisles with at least one central column of seat units positioned between the aisles.

However, a person of ordinary skill in the relevant art will understand that this is but one possible arrangement of columns, and that greater or fewer columns may be included in the cabin 10 as needed or desired to achieve the appropriate cabin density.

For purposes of the application, the terms "next-front" and "next-back" refer locally to the relative location of the seat units 14 within each column 70A, 70B, and does not refer to the orientation of the seat units 14 with respect to the overall cabin 10. In other words, the term "next-front seat unit" means that the seat unit 14 is located directly in front of another seat unit 14 within one or more of the columns 70A, 70B, and the term "next-back seat unit" means that the seat unit 14 is located directly behind another seat unit 14 within one or more of the columns 70A, 70B, but neither term is intended to refer to a more global orientation of the seat units 14 within the cabin 10.

Figure 11:
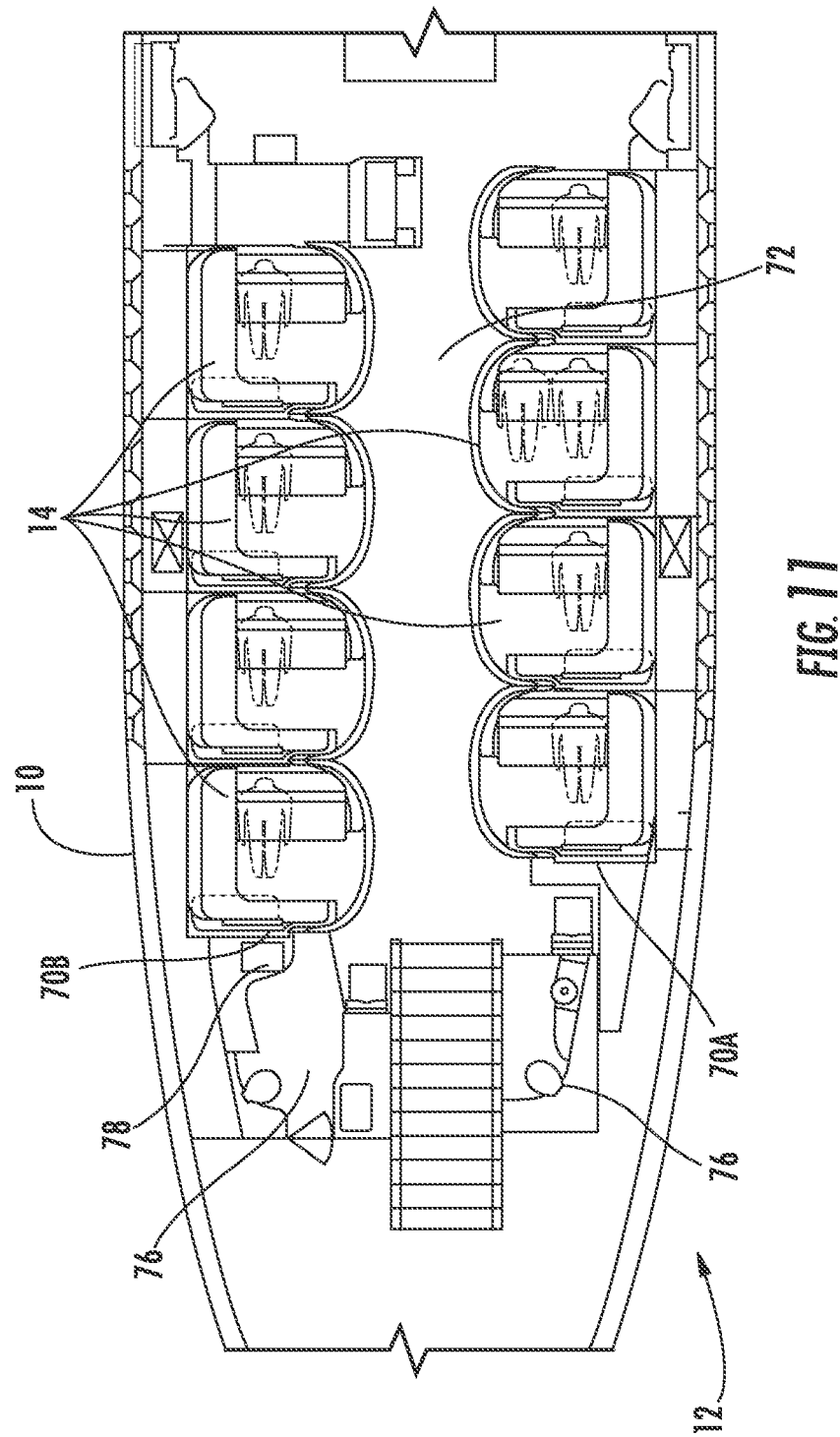
FIG. 11 is a top view of a cabin comprising another arrangement of a plurality of seat units, according to certain embodiments of the present invention.

Furthermore, in certain embodiments, the seat units 14 within each column 70A, 70B may be arranged so that the columns 70A, 70B are staggered from one another so that the seat units 14 within one column 70A, 70B are not laterally aligned with the seat units 14 within the other column 70A, 70B, and therefore do not produce a symmetrical mirror image. In other words, one of the columns 70A, 70B may be staggered toward the front or the back of the cabin 10 relative to one of the other columns 70A, 70B. As a result, the entire arrangement 12 exhibits a staggered pattern. In certain embodiments, as shown in FIG. 1, the entire arrangement 12 may comprise a total of six seat units 14 in the staggered pattern. In other embodiments, as shown in FIG. 11, the entire arrangement 12 may comprise a total of eight seat units 14 in the staggered pattern.

Figure 8:
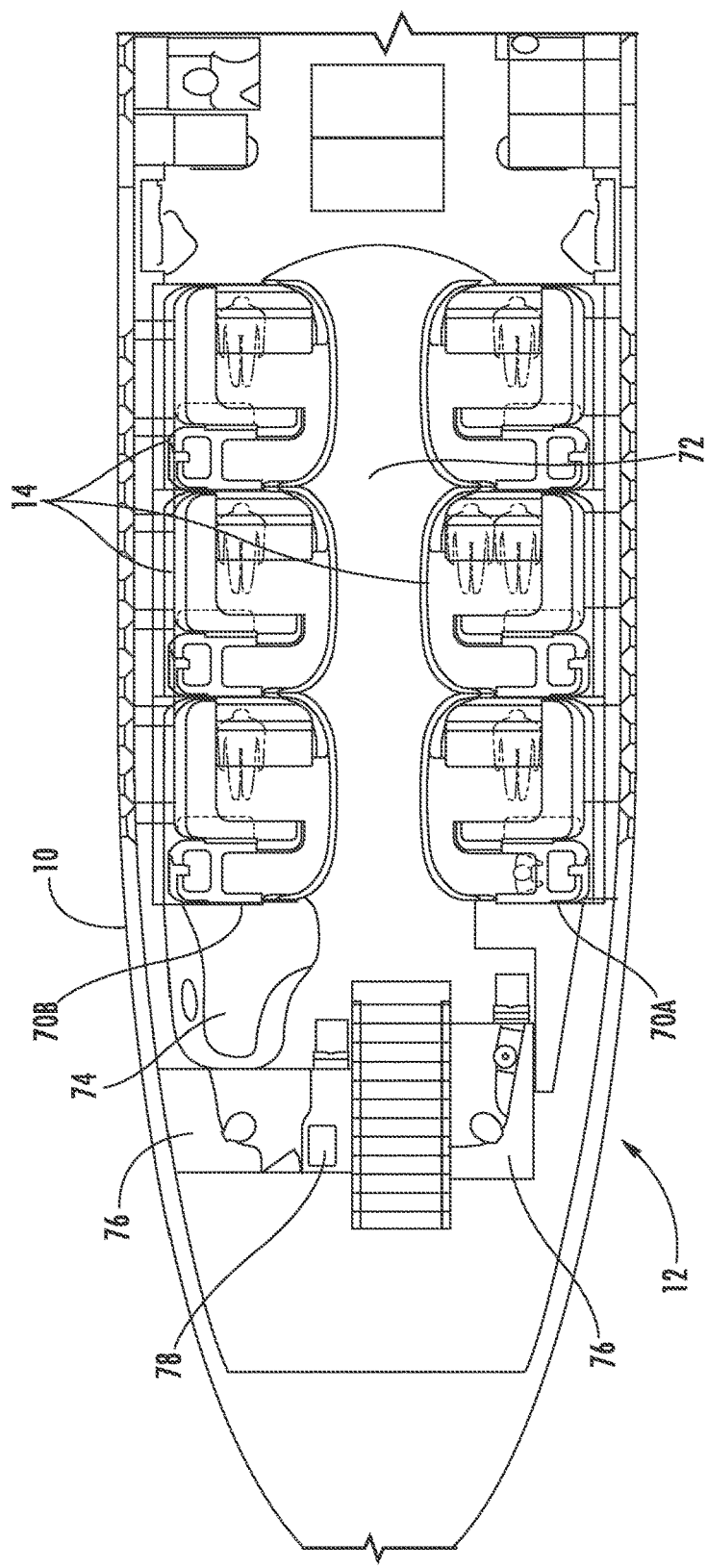
FIG. 8 is a top view of a cabin comprising another arrangement of a plurality of seat units and a wellbeing zone, according to certain embodiments of the present invention.
Figure 9:
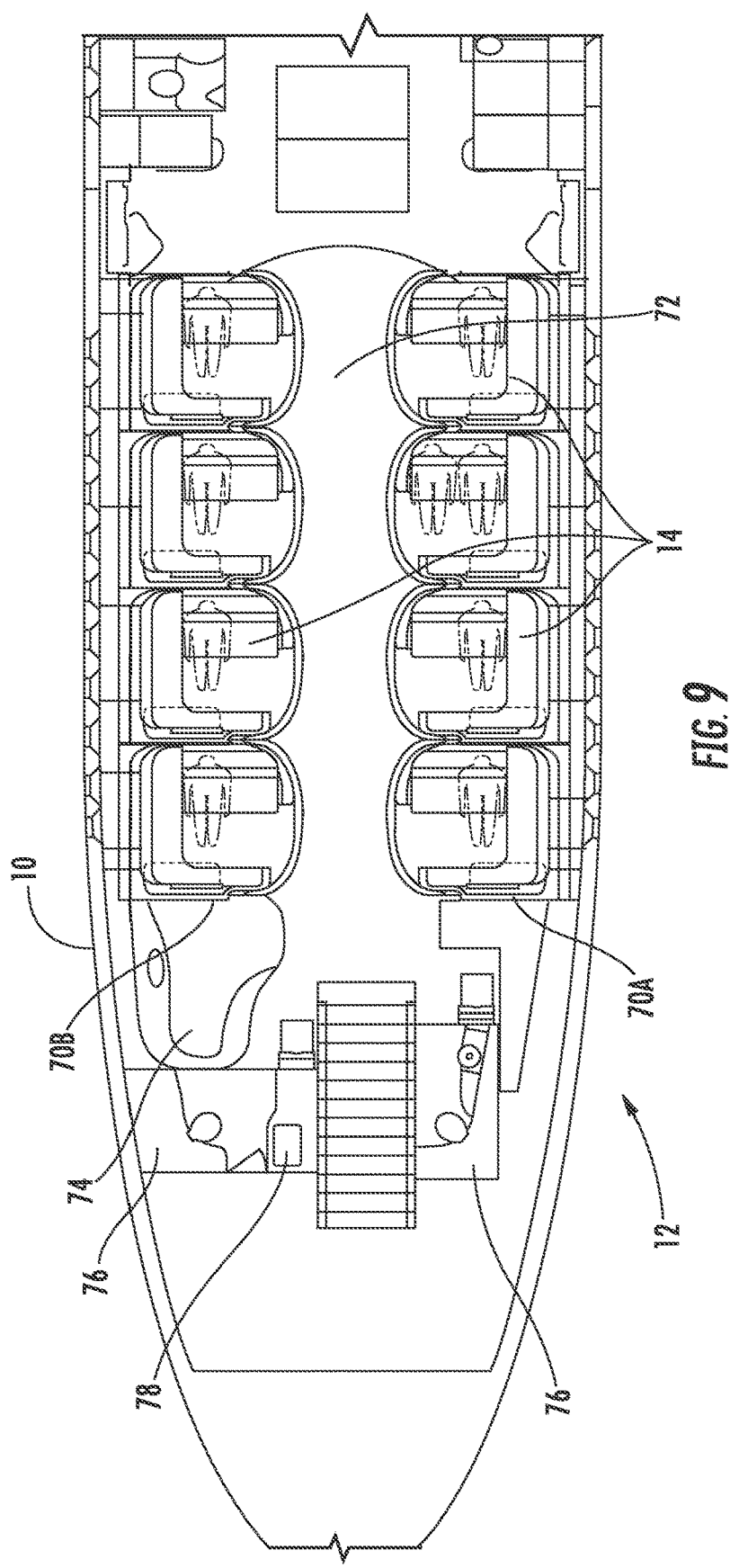
FIG. 9 is a top view of a cabin comprising another arrangement of a plurality of seat units and a wellbeing zone, according to certain embodiments of the present invention.

In additional embodiments, the entire arrangement 12 may comprise seat units 14 in a laterally aligned pattern, as shown in FIGS. 8-9, which may provide additional space for more seat units 14 and/or a wellbeing zone 74. In some embodiments, the wellbeing zone 74 may also be included with the staggered arrangement of seat units 14. In certain embodiments, as shown in FIGS. 9 and 11, the arrangement 12 may omit the individual wellbeing areas 56 from within each individual seat unit 14.

The configuration of the seat units 14 shown in FIGS. 1-11 may be identical for all the passengers, according to certain embodiments. However, a person of ordinary skill in the relevant art will understand that it is not required that each of the seat units 14 be identical in every aspect, and in some cases, it may be desirable to have the seat units 14 differ from one another in certain locations within the cabin 10.

Figure 10:
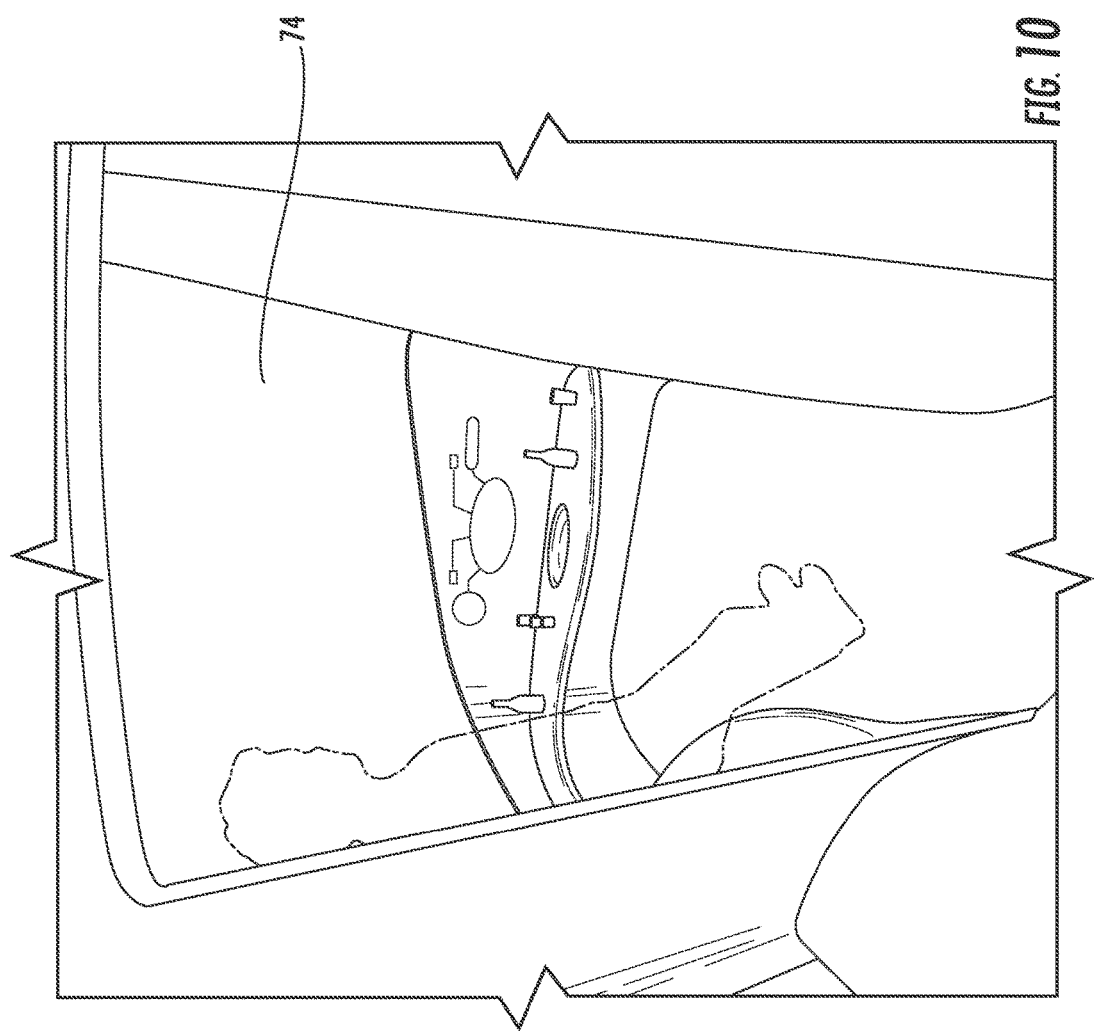
FIG. 10 is a perspective view of a wellbeing zone within a cabin, according to certain embodiments of the present invention.

As best illustrated in FIG. 10, the wellbeing zone 74 is configured to provide an area for passengers to stretch and improve circulation and fitness. The wellbeing zone 74 may be provided with an air supply having an enriched oxygen and moisture content, as compared to the oxygen and moisture content of the air supply to surrounding areas of the cabin 10. The wellbeing zone 74 may be further equipped with products to counteract negative effects of air travel, including but not limited to moisturizers and creams to protect skin, high quality water to counteract dehydration, and other drinks and fruits to boost immunity. In addition, the lighting, sounds, scent, and projection of moving images on walls of the wellbeing zone 74 may be designed and easily altered to enhance the overall experience.

As illustrated in FIGS. 1, 8-9, and 11, the arrangement 12 may further comprise at least one expanded lavatory 76. In certain embodiments, the arrangement 12 may comprise a lavatory 76 without a shower, and a second lavatory that comprises a shower 78.

Figure 2:
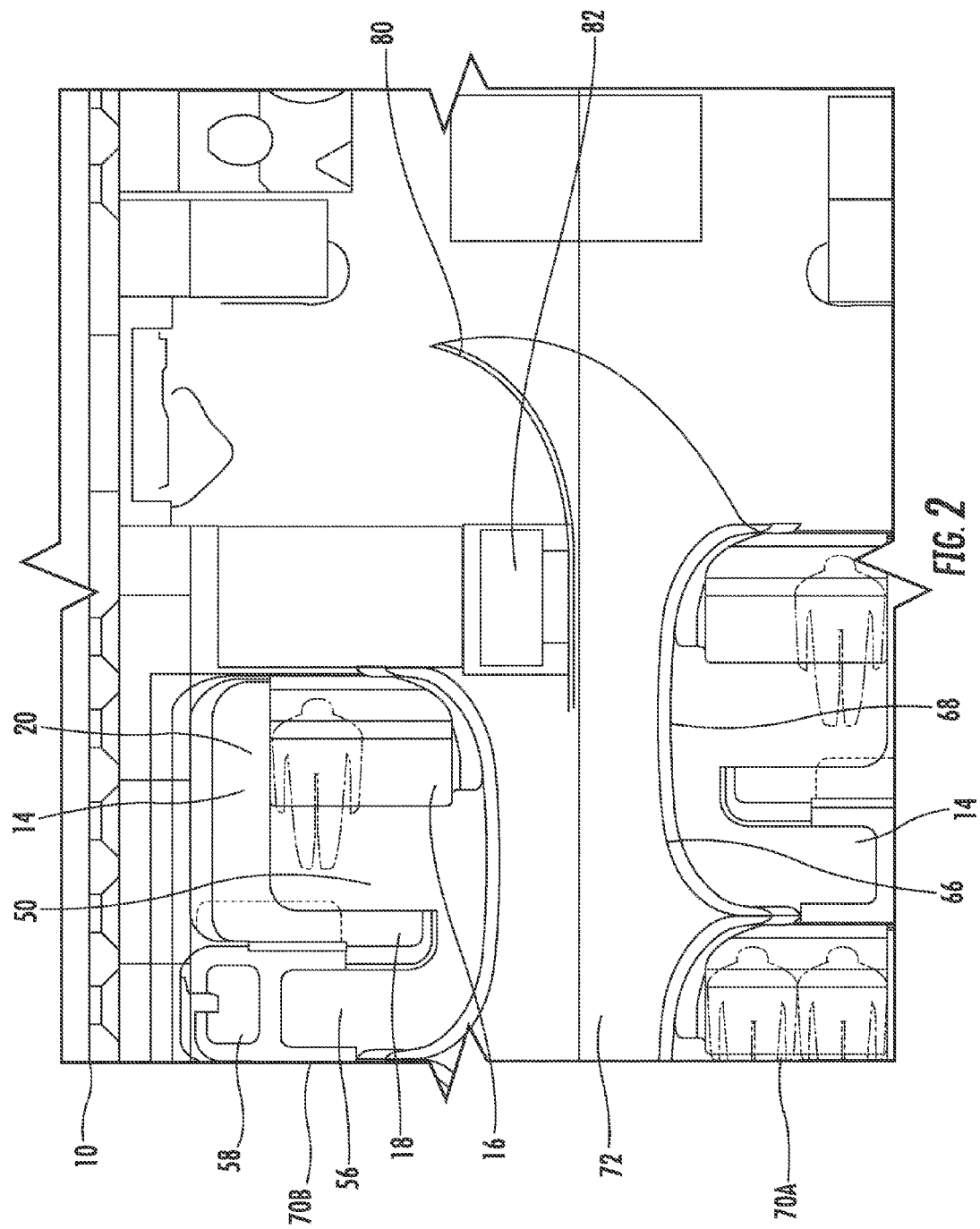
FIG. 2 is a top view of a portion of the cabin layout of FIG. 1.
Figure 3:
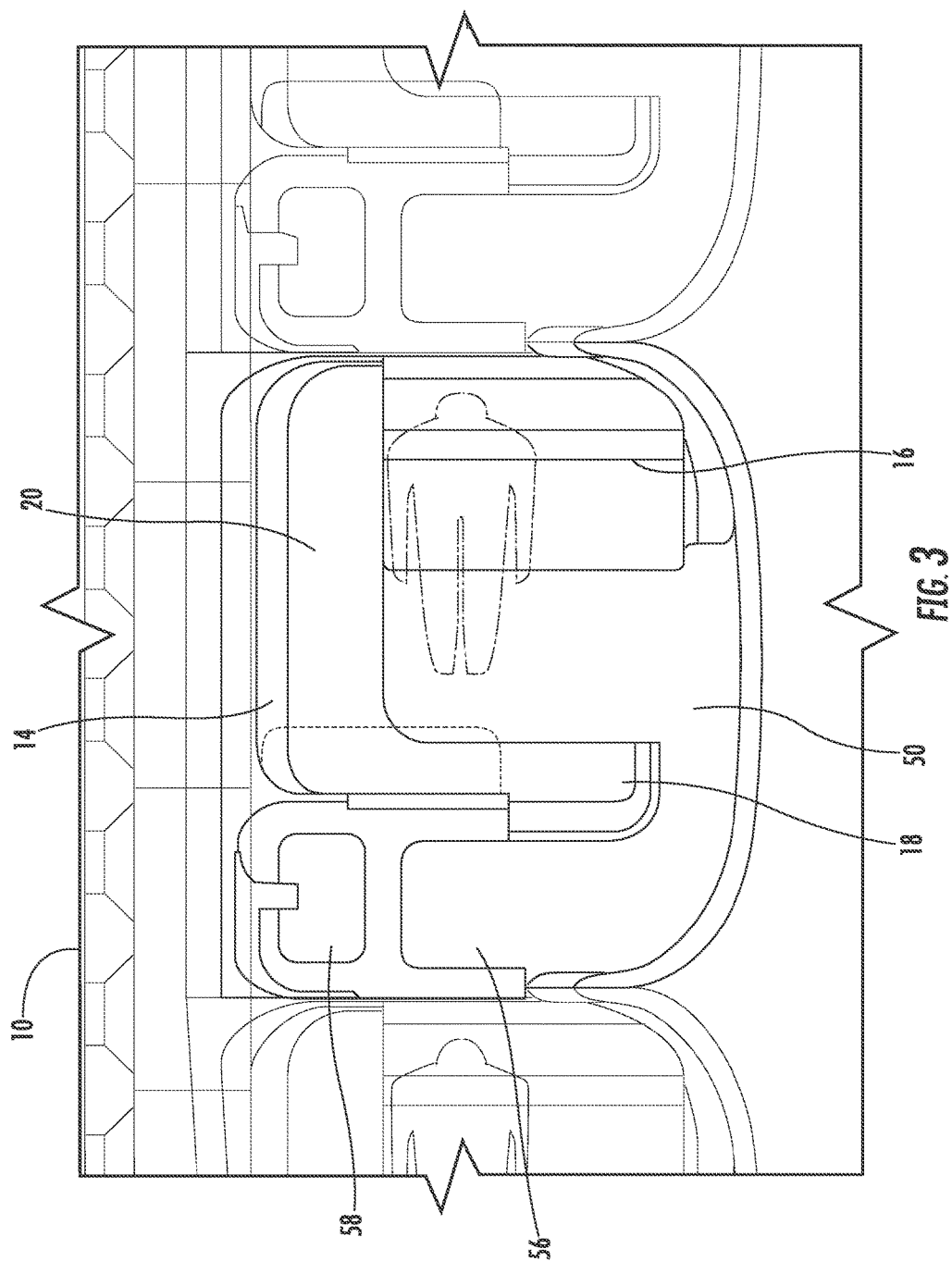
FIG. 3 is a top view of a seat unit, according to certain embodiments of the present invention.

As best illustrated in FIGS. 1-2, the arrangement 12 may also comprise a screen 80 that is configured to conceal a lift cart 82 to further enhance the luxury experience within the arrangement 12. The screen 80 may fold away during TTL.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A wide-body commercial aircraft cabin arrangement comprising:
    a plurality of seat units, each seat unit comprising a primary seat and a secondary seat arranged facing one another, wherein the primary seat and the secondary seat are configured to combine into a single bed position for the seat unit;
    wherein the plurality of seat units are arranged in two columns separated by a wide central aisle; and
    wherein the primary seat comprises a width of 50 inches or more, the width being configured for a passenger to be seated in multiple orientations within the primary seat, which range from having his or her body oriented in a direction that is substantially parallel to a longitudinal axis of the seat unit to having his or her body oriented in a direction that is substantially perpendicular to the longitudinal axis of the seat unit.

2. The wide-body commercial aircraft cabin arrangement of claim 1, wherein each seat unit further comprises a wellbeing area comprising a lavatory.

3. The wide-body commercial aircraft cabin arrangement of claim 1, wherein each seat unit further comprises at least one privacy curtain that substantially encloses each seat unit.

4. The wide-body commercial aircraft cabin arrangement of claim 1, wherein each seat unit further comprises a side extension arranged along one side of a space between the primary seat and the secondary seat.

5. The wide-body commercial aircraft cabin arrangement of claim 1, wherein the single bed position comprises a surface area that is greater than 4000 square inches.

6. The wide-body commercial aircraft cabin arrangement of claim 1, wherein the primary seat comprises a width that is configured for two passengers to share the primary seat.

7. The wide-body commercial aircraft cabin arrangement of claim 1, wherein the columns are staggered from one another so that the seat units within one of the two columns are not laterally aligned with the seat units within the other one of the two columns.

8. An aircraft cabin arrangement comprising:
    a plurality of seat units, each seat unit comprising a primary seat and a secondary seat arranged facing one another, and a side extension arranged along one side of a space between the primary seat and the secondary seat;
    wherein the primary seat, the secondary seat, and the side extension are configured to combine into a single bed position for the seat unit having a surface area that is greater than 4000 square inches;
    wherein the plurality of seat units are arranged in two columns separated by a wide central aisle; and
    wherein the primary seat comprises a width of 50 inches or more, the width being configured for a passenger to be seated in multiple orientations within the primary seat, which range from having his or her body oriented in a direction that is substantially parallel to a longitudinal axis of the seat unit to having his or her body oriented in a direction that is substantially perpendicular to the longitudinal axis of the seat unit.

9. The aircraft cabin arrangement of claim 8, wherein each seat unit further comprises a wellbeing area comprising a lavatory.

10. The aircraft cabin arrangement of claim 8, wherein each seat unit further comprises at least one privacy curtain that substantially encloses each seat unit.

11. The aircraft cabin arrangement of claim 8, wherein the primary seat comprises a width that is configured for two passengers to share the primary seat.

12. The aircraft cabin arrangement of claim 8, wherein the columns are staggered from one another so that the seat units within one of the two columns are not laterally aligned with the seat units within the other one of the two columns.

13. A aircraft cabin arrangement comprising:
    a plurality of seat units, each seat unit comprising a primary seat and a secondary seat arranged facing one another, wherein the primary seat and the secondary seat are configured to combine into a single bed position for the seat unit, wherein the plurality of seat units are arranged in two columns separated by a wide central aisle; and
    a wellbeing zone comprising an air supply comprising an enriched oxygen and moisture content, as compared to an oxygen and moisture content of the air supply to surrounding areas of the aircraft cabin;
    wherein the primary seat comprises a width of 50 inches or more, the width being configured for a passenger to be seated in multiple orientations within the primary seat, which range from having his or her body oriented in a direction that is substantially parallel to a longitudinal axis of the seat unit to having his or her body oriented in a direction that is substantially perpendicular to the longitudinal axis of the seat unit.

14. The aircraft cabin arrangement of claim 13, wherein each seat unit further comprises a wellbeing area comprising a lavatory.

15. The aircraft cabin arrangement of claim 13, wherein each seat unit further comprises at least one privacy curtain that substantially encloses each seat unit.

16. The aircraft cabin arrangement of claim 13, wherein the single bed position comprises a surface area that is greater than 4000 square inches.

17. The aircraft cabin arrangement of claim 13, wherein the primary seat comprises a width that is configured for two passengers to share the primary seat.

18. The aircraft cabin arrangement of claim 13, wherein the columns are staggered from one another so that the seat units within one of the two columns are not laterally aligned with the seat units within the other one of the two columns.

\* \* \* \* \*